US012641446B2

(12) United States Patent
Rajan et al.

(10) Patent No.: US 12,641,446 B2
(45) Date of Patent: May 26, 2026

(54) SYSTEMS AND METHODS FOR ADJUSTING TRANSMISSION POWER FOR A MOBILE DEVICE

(71) Applicant: Apple Inc., Cupertino, CA (US)

(72) Inventors: Aneesh Rajan, Campbell, CA (US); Jay P Shah, Newark, CA (US); Lohit Sarna, San Mateo, CA (US); Mihir Hemant Bhavsar, San Diego, CA (US); Sairam GuttaTejaSwarupa, Cupertino, CA (US); Sanjay K Verma, San Jose, CA (US); Sudeep Bhattarai, Hayward, CA (US); Sudhir K Baghel, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 558 days.

(21) Appl. No.: 18/069,767

(22) Filed: Dec. 21, 2022

(65) Prior Publication Data

US 2023/0370862 A1     Nov. 16, 2023

Related U.S. Application Data

(60) Provisional application No. 63/340,334, filed on May 10, 2022.

(51) Int. Cl.
    *H04W 52/28*     (2009.01)
    *H04L 5/00*      (2006.01)
    *H04W 16/28*     (2009.01)
(52) U.S. Cl.
    CPC ........... *H04W 16/28* (2013.01); *H04L 5/0053* (2013.01); *H04W 52/285* (2013.01)

(58) Field of Classification Search
    CPC ........... H04W 52/285; H04W 52/245; H04W 52/283
    See application file for complete search history.

(56) References Cited

U.S. PATENT DOCUMENTS

| | | | |
|---|---|---|---|
| 6,519,262 B1* | 2/2003 | Stephens | H04B 7/18532 370/442 |
| 7,463,582 B2* | 12/2008 | Kelly | H01Q 3/08 370/321 |
| 10,193,616 B1* | 1/2019 | Parr | H04L 1/1692 |
| 11,224,021 B2 | 1/2022 | Cirik et al. | |
| 2002/0137457 A1* | 9/2002 | Nivens | H04B 7/18513 455/70 |
| 2011/0143806 A1* | 6/2011 | Song | H04W 52/386 455/522 |

(Continued)

OTHER PUBLICATIONS

Ikram, Waqas, Adaptive Multi-Channel Transmission Power Control for Industrial Wireless Instrumentation, May 2014, pp. 1-13, IEEE Transactions on Industrial Informatics, vol. 10, No. 2, https://ieeexplore.ieee.org/stamp/stamp.isp?tp=&arnumber=6763067.

(Continued)

*Primary Examiner* — Fahmida S Chowdhury
(74) *Attorney, Agent, or Firm* — FLETCHER YODER PC

(57) ABSTRACT

An electronic device includes a transmitter and processing circuitry communicatively coupled to the transmitter and configured to determine a position of a communication hub relative to the electronic device and cause the transmitter to transmit a signal directed to the communication hub at a transmission power based on the position.

20 Claims, 5 Drawing Sheets

(56) References Cited

U.S. PATENT DOCUMENTS

| | | | |
|---|---|---|---|
| 2014/0133979 A1* | 5/2014 | Sutton | B64C 27/41 |
| | | | 464/134 |
| 2014/0248150 A1* | 9/2014 | Sutton | F16D 3/33 |
| | | | 464/134 |
| 2016/0037453 A1* | 2/2016 | Sivanadyan | H04W 52/44 |
| | | | 370/329 |
| 2019/0296802 A1* | 9/2019 | Fang | H04B 7/18515 |
| 2021/0036771 A1* | 2/2021 | Levy | H04B 7/195 |
| 2021/0037539 A1* | 2/2021 | Levy | H04B 7/18513 |
| 2021/0058171 A1* | 2/2021 | Alasti | H04B 7/1851 |
| 2021/0126724 A1* | 4/2021 | Ito | H04L 27/00 |
| 2021/0285895 A1* | 9/2021 | Yang | H01Q 9/0428 |
| 2021/0377825 A1* | 12/2021 | Deenoo | H04W 36/0077 |
| 2022/0035043 A1* | 2/2022 | Tsuboi | H04W 52/243 |
| 2022/0052771 A1* | 2/2022 | Alasti | H04B 7/1851 |
| 2022/0053590 A1* | 2/2022 | Ma | H04W 24/04 |
| 2023/0055988 A1* | 2/2023 | Liberg | H04B 7/18519 |
| 2023/0370862 A1* | 11/2023 | Rajan | H04W 52/285 |
| 2024/0163825 A1* | 5/2024 | Park | H04W 72/20 |
| 2024/0397554 A1* | 11/2024 | Zhou | H04L 1/1812 |
| 2025/0016592 A1* | 1/2025 | Rune | H04B 7/18545 |
| 2025/0071687 A1* | 2/2025 | Zhu | H04W 52/14 |

OTHER PUBLICATIONS

Miteq Technical Note 25T029, Uplink Power Control System, Oct. 2008, pp. 1-47, https://hardamiteq.com/docs/29TEC.PDF.

* cited by examiner

SYSTEMS AND METHODS FOR ADJUSTING TRANSMISSION POWER FOR A MOBILE DEVICE

CROSS-REFERENCE TO RELATED APPLICATIONS

This application claims priority to and benefit of U.S. Provisional Application No. 63/340,334, filed May 10, 2022, and entitled "SYSTEMS AND METHODS FOR ADJUSTING TRANSMISSION POWER FOR A MOBILE DEVICE," which is incorporated herein by reference in its entirety for all purposes.

BACKGROUND

The present disclosure relates generally to wireless communication and more specifically to adjusting transmission power for communicating signals, such as data.

A mobile communication device may communicate signals (e.g., signals that include data) via a communication hub, such as a non-terrestrial station, a satellite, and/or a high altitude platform station. For instance, the mobile communication device may transmit a signal to the communication hub, and the communication hub may forward the signal to a destination device. It is now recognized that operation of the mobile communication device to transmit a signal to the communication hub may be improved. For example, in certain existing approaches, the mobile communication device may transmit multiple signals at approximately the same transmission power. However, transmitting the signals at the same transmission power may cause excessive power consumption associated with operating the mobile communication device, which may be inefficient and shorten a battery life of the device.

SUMMARY

In one embodiment, an electronic device includes a transmitter and processing circuitry communicatively coupled to the transmitter and configured to determine a position of a communication hub relative to the electronic device and cause the transmitter to transmit a signal directed to the communication hub at a transmission power based on the position.

In another embodiment, a non-transitory, computer-readable medium includes instructions that, when executed by processing circuitry, cause the processing circuitry to determine an elevation angle of a communication hub relative to an electronic device, determine a transmission power based on the elevation angle, and cause the electronic device to transmit a signal directed to the communication hub at the transmission power.

In yet another embodiment, an electronic device includes a transceiver and processing circuitry communicatively coupled to the transceiver and configured to determine an elevation angle of a communication hub relative to the electronic device, adjust a transmission power at which the transceiver transmits a signal based on the elevation angle, and cause the transceiver to transmit the signal directed to the communication hub at the transmission power.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
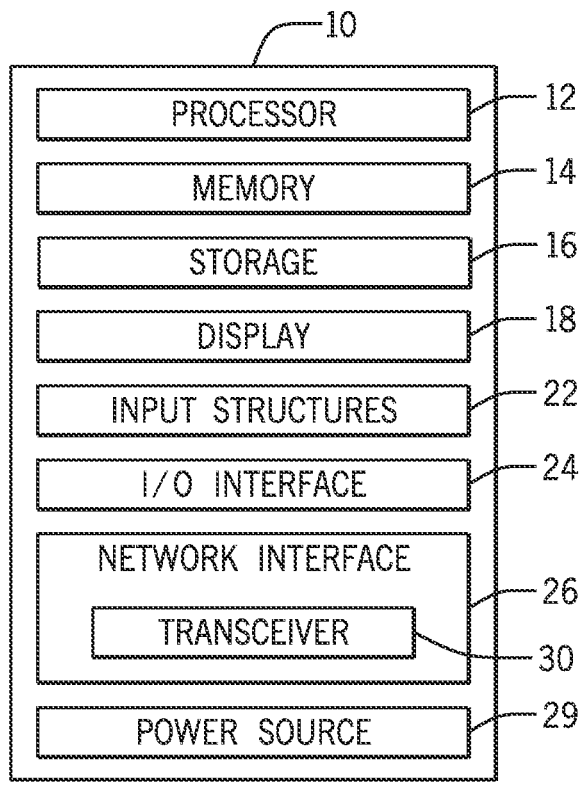
FIG. 1 is a block diagram of an electronic device, according to embodiments of the present disclosure.

This disclosure is directed to adjusting power transmission used to transmit signals via a mobile communication device. The mobile communication device may initially transmit a signal to a communication hub, and the communication hub may forward the signal received from the mobile communication device to a destination device. For example, the signal may include or be associated with various forms of communication (e.g., emergency text messaging, emergency voice calling, acknowledgement messaging), video streaming, internet browsing, and so forth. In some circumstances, certain elements, such as structures and/or foliage, may interfere with or affect transmission between the mobile communication device and the communication hub. As a result, the communication hub may not successfully receive a signal transmitted from the mobile communication device. In response to determining that the communication hub does not successfully receive the signal transmitted by the mobile communication device, such as based on an absence of an acknowledgement signal received from the communication hub, the mobile communication device may re-transmit the signal toward the communication hub.

In existing approaches, the mobile communication device may transmit and re-transmit different signals at the same or substantially the same transmission power. That is, at a first instance or period of time, the mobile communication device may transmit a first signal to the communication hub at a particular transmission power. At a second instance or period of time, the mobile communication device may transmit a second signal to the communication hub at the same particular transmission power. Additionally, at a third instance or period of time, the mobile communication device may re-transmit the second signal to the communication hub at the particular transmission power, such as in response to determining that the communication hub does not successfully receive the second signal. However, transmitting each signal at the particular transmission power may cause the mobile communication device to consume an undesirable (e.g., excessive) amount of power during operation, thereby decreasing battery life of the mobile communication device.

Embodiments herein provide various apparatuses and techniques to adjust the transmission power used by the mobile communication device to transmit a signal to the communication hub for subsequent transmission to a destination device. In some embodiments, the mobile communication device may determine a relative positioning between the mobile communication device and the communication hub and adjust the transmission power based on the relative positioning. For instance, the relative positioning may include an elevation angle, and the mobile communication device may reduce the transmission power based on an increased elevation angle. Reducing the transmission power may reduce an amount of power consumed by the mobile communication device to transmit data signal, thereby increasing a battery life (e.g., state of charge of a battery) of the mobile communication device. In particular, the increased elevation angle may improve a line of sight between the mobile communication device and the communication hub. The improved line of sight may enable the communication hub to receive the signal transmitted at the reduced transmission power. As such, adjusting the transmission power based on the elevation angle may improve longevity of a battery or power source of the mobile communication device without reducing effective operation to communicate with the communication hub.

Furthermore, the mobile communication device may adjust the transmission power used to re-transmit a signal relative to a previous transmission power used to transmit the signals. For example, the mobile communication device may increase the transmission power at which a signal is re-transmitted to improve a capability of the communication hub to receive the signal and/or improve a quality of the signal received by the communication hub. In some embodiments, the mobile communication device may repeatedly re-transmit the signal and iteratively increase the transmission power each time the signal is re-transmitted until the signal is successfully received at the communication hub. Thus, the mobile communication device may adjustably transmit the signal at varying transmission powers to improve power consumption efficiency associated with transmitting the signal while enabling receipt of the signal by the communication hub.

FIG. 1 is a block diagram of an electronic device or mobile communication device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a satellite connection (e.g., via a satellite network), a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, New Radio (NR) cellular network, $6^{th}$ generation (6G) cellular network and beyond, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating signals using one of the aforementioned networks. The power source 29 of the electronic device 10 may include any suitable source of power, such as a rechargeable lithium polymer (Li-poly) battery and/or an alternating current (AC) power converter.

Figure 2:
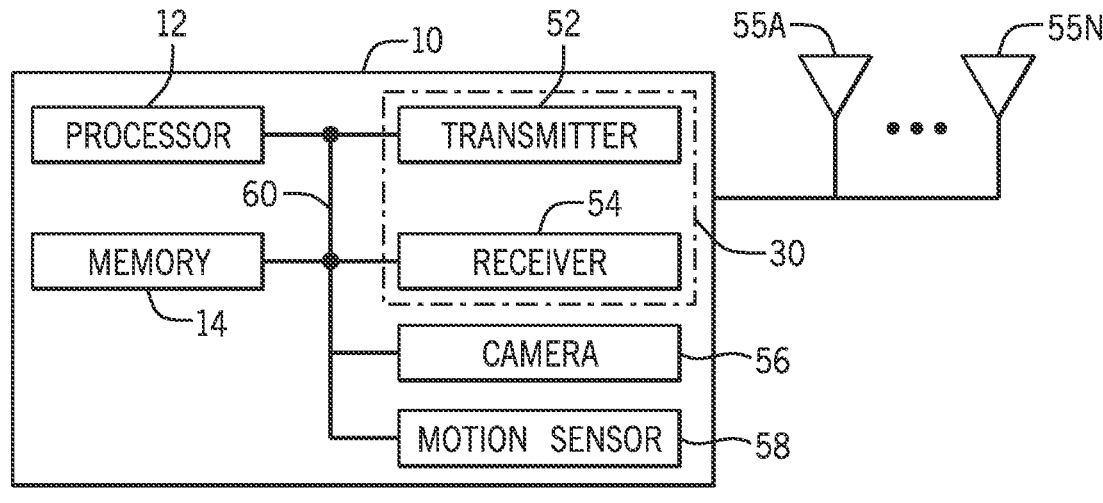
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively transmit and receive signals between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. For example, the electronic device 10 may include a first transceiver to send and receive messages using a first wireless communication network, a second transceiver to send and receive messages using a second wireless communication network, and a third transceiver to send and receive messages using a third wireless communication network, though any or all of these transceivers may be combined in a single transceiver. In some embodiments, the transmitter 52 and the receiver 54 may transmit and receive information via other wired or wireline systems or means.

The electronic device 10 may also include one or more cameras or image or light sensors (e.g., as part of the input structures 22). The one or more cameras or image or light sensors (collectively referred to as "a camera 56" herein) may capture images and/or determine amounts of light surrounding the electronic device 10. In some embodiments, the camera 56 may include a front-facing camera (e.g., disposed on a display surface of the electronic device 10 having the display 18) and/or a rear-facing camera (e.g., disposed on a base or back surface, opposite the display surface, of the electronic device 10).

The electronic device 10 may include one or more motion sensors 58 (e.g., as part of the input structures 22). The one or more motion sensors (collectively referred to as "a motion sensor 58" herein) may include an accelerometer, gyroscope, gyrometer, and the like, that detect and/or facilitate determining an orientation (e.g., including pitch, yaw, roll, and so on) and/or motion of the electronic device 10.

As illustrated, the various components of the electronic device 10 may be coupled together by a bus system 60. The bus system 60 may include a data bus, for example, as well as a power bus, a control signal bus, and a status signal bus, in addition to the data bus. The components of the electronic device 10 may be coupled together or accept or provide inputs to each other using some other mechanism.

As discussed above, the electronic device 10 may transmit a signal directed to a communication hub for subsequent transmission to a recipient. For example, an existing electronic device 10 may transmit different signals at a transmission power to enable successful receipt of the data by the communication hub. However, in response to a determination that the communication hub does not successfully receive the signal, the electronic device 10 may re-transmit the signal directed to the communication hub, such as until the electronic device 10 determines that the communication hub successfully receives the signal (e.g., in response to receipt of an acknowledgement signal from the communication hub).

Embodiments herein provide various apparatuses and techniques to reduce power consumption of the electronic device 10 by adjusting the transmission power at which the electronic device 10 may transmit a signal to a communication hub. For example, the electronic device 10 may determine whether a receive signal quality of a signal (e.g., an initial or test signal) transmitted by the electronic device 10 and received by the communication hub is above a threshold value indicative of a desirable communication quality. In response to determining that the receive signal quality is above the threshold value, thereby indicating desirable communication quality, the electronic device 10 may determine a relative positioning between the electronic device 10 and the communication hub, such as an elevation angle of the electronic device 10 relative to the communication hub. The electronic device 10 may then transmit a signal to the communication hub based on the relative positioning. Additionally, the electronic device 10 may adjust the transmission power of which signal may be re-transmitted. By way of example, in response to determining that the communication hub does not successfully receive the signal transmitted at a previous transmission power, the electronic device 10 may re-transmit the signal at an increased transmission power to facilitate successful receipt of the signal by the communication hub. In this manner, the electronic device 10 may transmit and/or re-transmit a signal at a transmission power that may be more suitable for successful receipt by the communication hub. For example, a power consumption associated with transmitting a signal via the electronic device 10 may be reduced, thereby improving (e.g., increasing) a battery life of a battery (e.g., the power source 29) of the electronic device 10 while still enabling receipt of signals by the communication hub.

Figure 3:
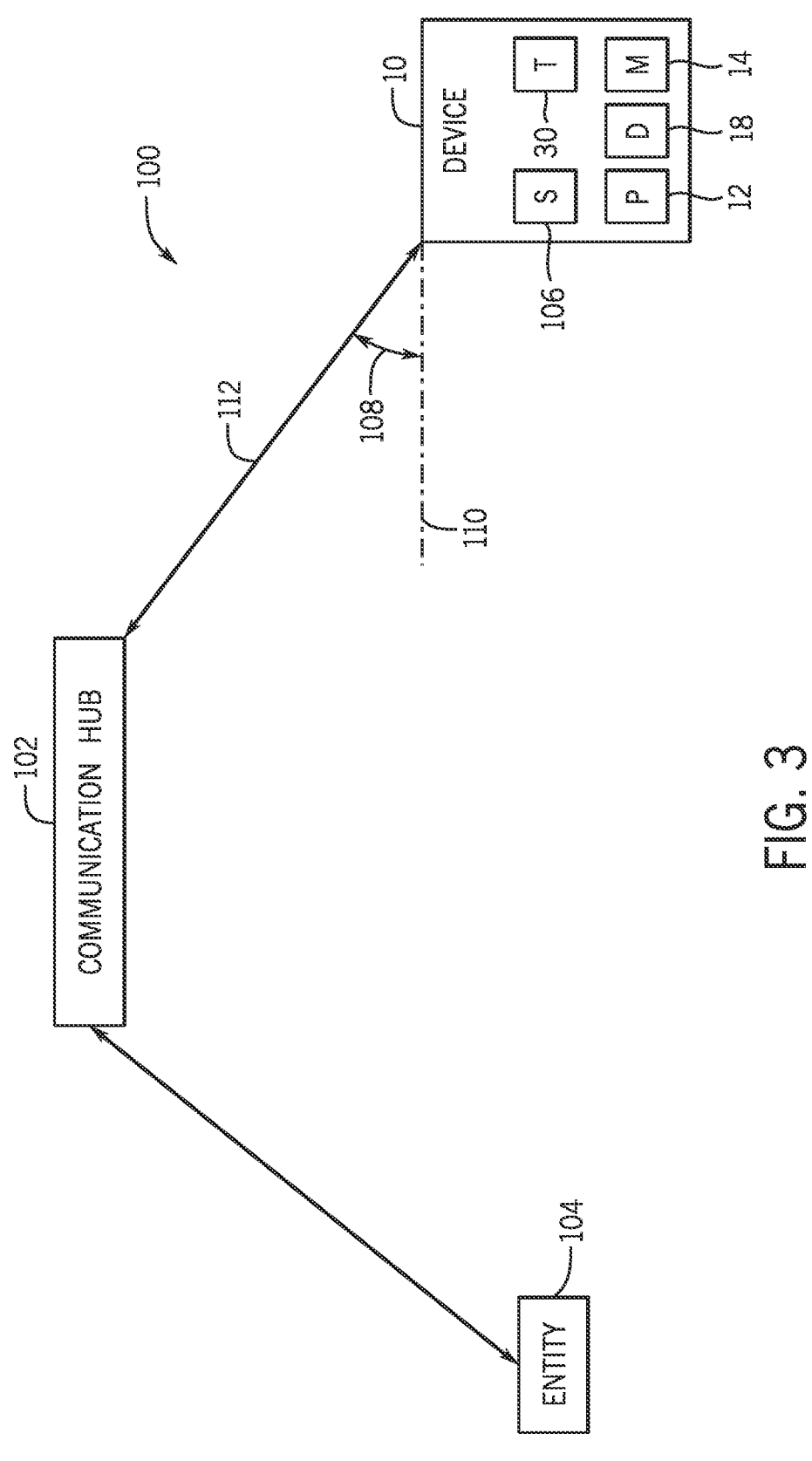
FIG. 3 is a schematic diagram of a communication system including the electronic device of FIG. 1, according to embodiments of the present disclosure.

With the preceding in mind, FIG. 3 is a schematic diagram of a communication system 100 including the electronic device 10, according to embodiments of the present disclosure. The communication system 100 includes a communication hub 102, which may include any combination of non-terrestrial base stations, high altitude platform stations, airborne base stations, spaceborne base stations, satellites (e.g., a low earth orbit satellite, a medium earth orbit satellite, a geosynchronous equatorial orbit satellite, a high earth orbit satellite), and any other suitable nonstationary communication node, communicatively coupled to the electronic device 10, which may be implemented as user equipment. The communication hub 102 may be communicatively coupled to an entity 104, such as another electronic device, a terrestrial base station, a ground station, a call center, and so forth, to enable communication of signals between the entity 104 and the electronic device 10. For example, the electronic device 10, such as the transceiver 30, may transmit a signal to the communication hub 102, and the communication hub 102 may forward the signal to the entity 104. Additionally or alternatively, the entity 104 may transmit a signal to the communication hub 102, and the communication hub 102 may forward the signal to the electronic device 10 for receipt, such as via the transceiver 30.

The electronic device 10 may also determine whether the communication hub 102 successfully receives a signal transmitted by the electronic device 10. For example, the communication hub 102 may transmit an acknowledgement signal toward the electronic device 10 in response to receiving the signal from the electronic device 10. In response to receiving an acknowledgement signal from the communication hub 102, such as via the transceiver 30 (e.g., the receiver 54), after (e.g., within a duration of time of) transmitting the signal to the communication hub 102, the electronic device 10 may determine that the communication hub 102 successfully receives the signal. However, in response to determining that an acknowledgment signal from the communication hub 102 was not received after (e.g., within the duration of time of) transmitting the signal to the communication hub 102, the electronic device 10 may determine that the communication hub 102 did not successfully receive the signal. As a result, the electronic device 10 may re-transmit the signal toward the communication hub 102. Indeed, the electronic device 10 may continually or repeatedly re-transmit the signal toward the communication hub 102 until an acknowledgement signal is received from the communication hub 102 via the transceiver 30 to indicate successful receipt of the transmitted signal by the communication hub 102.

The electronic device 10 may adjust a transmission power associated with transmitting a signal to the communication hub 102. For instance, the electronic device 10 may determine a parameter indicative of a communication quality between the electronic device 10 and the communication hub 102. The processor 12 may cause the transceiver 30 to adjust the transmission power used to transmit the signal directed to the communication hub 102 based on the indicated communication quality. During higher communication quality conditions, the communication hub 102 may more readily receive a signal (e.g., at a sufficient or threshold receive quality or power) from the electronic device 10. As an example, the communication hub 102 may be capable of receiving a signal transmitted by the electronic device 10 at a lower transmission power. However, during lower communication quality conditions, it may be more difficult for the communication hub 102 to receive the signal from the electronic device 10. Thus, the signal may be transmitted by the electronic device 10 at a greater transmission power to enable or facilitate receipt of the signal by the communication hub 102.

Reducing the transmission power used to transmit a signal to the communication hub 102 may reduce power consumption of the electronic device 10 to transmit the signal. In other words, less power may be used to transmit the signal at a first, lower transmission power as compared to transmitting the same signal at a second, higher transmission power. Therefore, adjusting the transmission power used to transmit a signal based on a determined communication quality may reduce power consumption associated with operation of the electronic device 10 while still enabling successful receipt of the signal by the communication hub 102. In this manner, a duration of time in which the electronic device 10 may actively operate (e.g., without having to recharge, generate, or otherwise obtain additional power) may be increased without diminishing signal transmission operations.

In some embodiments, the communication quality may be indicated by a relative positioning between the communication hub 102 and the electronic device 10. For this reason, the electronic device 10 may include a sensor 106 that determines various operating parameters that may be associated with movement of the communication hub 102 and/or the electronic device 10, such as a property associated with movement of the Earth (e.g., a gravitational property, an orbit of the Earth), a historical positioning of the communication hub 102, a motion of the electronic device 10, and the like, to determine the relative positioning between the communication hub 102 and the electronic device 10. The processor 12 may receive the determined operating parameters from the sensor 106 as sensor data and determine the location and/or orientation of the communication hub 102 based on the operating parameters, such as by using a mathematical model that associates the positioning of the communication hub 102 with values of the operating parameters. In additional or alternative embodiments, the processor 12 may determine the location and/or orientation of the communication hub 102 without usage of the sensor 106, such as based on preset or predetermined information and/or data (e.g., stored in the memory 14 and/or the storage 16) received from another component or system. The processor 12 may determine the relative positioning between the communication hub 102 and the electronic device 10 and operate the transceiver 30 to transmit a signal at a transmission power based on the determined relative positioning.

As an example, the processor 12 may determine an elevation angle 108 of the communication hub 102 relative to the electronic device 10. The elevation angle 108 may include an angle spanning between a horizon 110 and a line of sight 112 between the communication hub 102 and the electronic device 10. The elevation angle 108 may be indicative of a potential communication quality between the communication hub 102 and the electronic device 10. For example, a greater elevation angle 108 (e.g., an angle closer to 90 degrees, such as between 80 and 90 degrees, between 70 and 90 degrees, between 60 and 90 degrees, between 45 and 90 degrees, between 30 and 90 degrees, and so on) may indicate potentially reduced obstruction or interference (e.g., by a building, by foliage, by signals transmitted via other devices) of the line of sight 112, and therefore indicate potentially improved communication quality. A smaller elevation angle 108 (e.g., an angle closer to 0 degrees, such as between 0 and 10 degrees, between 0 and 20 degrees, between 0 and 30 degrees, between 0 and 45 degrees, and so on) may indicate potentially increased obstruction of the line of sight 112 and therefore indicate potentially reduced communication quality.

For this reason, the communication hub 102 may more readily or capably receive a signal transmitted from the electronic device 10 while elevation angle 108 is greater. Therefore, the electronic device 10 may reduce the transmission power used to transmit a signal to the communication hub 102 while the elevation angle 108 is greater. In other words, the transmission power used to transmit a signal from the electronic device 10 to the communication hub 102 may be inversely proportional to the elevation angle 108. For instance, the electronic device 10 may transmit a first signal at a first, greater transmission power toward the communication hub 102 in response to determining the elevation angle 108 is at a first, smaller angle. Additionally, the electronic device 10 may transmit a second signal at a second, smaller transmission power toward the communication hub 102 in response to determining the elevation angle 108 is at a second, larger angle. The communication hub 102 may be able to receive both the first signal and the second signal, even though the second signal is transmitted at a relatively smaller transmission power, because the communication quality between the electronic device 10 and the communication hub 102 may be relatively better at the second, larger elevation angle 108 (e.g., the line of sight 112 between the electronic device 10 and the communication hub 102 may be relatively less obstructed). In some embodiments, the processor 12 may utilize reference information or data (e.g., a database table, an equation, an algorithm) that associates different transmission power values with corresponding, respective elevation angle values. Upon determining an elevation angle 108, the processor 12 may select the transmission power value associated with a value of the determined elevation angle 108 based on the reference information and cause the transceiver 30 to transmit a signal based on the selected transmission power value.

The communication quality between the electronic device 10 and the communication hub 102 may also be indicated by a receive signal quality or power (e.g., received signal strength indication, reference signal received power, reference signal received quality, signal-to-noise ratio, signal to interference noise ratio), which may be based on an initial or test signal transmitted between the electronic device 10 and the communication hub 102. For example, the line of sight 112, obstructions, interferences, and so forth may affect the receive signal quality. Thus, the receive signal quality may also indicate a communication quality associated with transmission from the electronic device 10 toward the communication hub 102. For this reason, the electronic device 10 may also adjust the transmission power to transmit a signal based on the receive signal quality. As an example, the communication hub 102 may send a signal (e.g., a radio signal), and the transceiver 30 (e.g., the receiver 54) of the electronic device 10 may receive the signal, and the processing circuitry 12 may determine the receive signal quality based on properties of the signal. The processing circuitry 12 may then adjust the transmission power used to transmit a signal via the transceiver 30 based on the receive signal quality.

By way of example, in response to determining that the receive signal quality is below a threshold value, thereby indicating a potentially poor or undesirable communication quality condition, the processor 12 may cause the transceiver 30 to transmit a signal toward the communication hub 102 at a predetermined transmission power. The predetermined transmission power may correspond to a maximum allowable transmission power (e.g., an upper transmission power limit) at which the electronic device 10 may transmit a signal to facilitate receipt of the signal by the communication hub 102. However, in response to determining that the receive signal quality is above the threshold value, thereby indicating a sufficient or desirable communication quality condition, the processor 12 may cause the transceiver 30 to transmit a signal toward the communication hub 102 at a transmission power below the predetermined transmission power. Thus, power consumption associated with transmitting a signal via the electronic device 10 may be adjusted during the sufficient communication quality condition. For example, the processor 12 may determine the elevation angle 108 and reduce the transmission power below the predetermined transmission power based on the elevation angle 108 while the receive signal quality is above the threshold value. In this way, the electronic device 10 may adjust the transmission power while the receive signal quality is above the threshold value, and the electronic device 10 may transmit a signal at the predetermined transmission power regardless of the elevation angle 108 while the receive signal quality is below the threshold value.

The electronic device 10 may also or alternatively determine whether a transmitted signal is received by the communication hub 102 and re-transmit the signal in response to determining that the transmitted signal is not received by the communication hub 102. As an example, the electronic device 10 may determine whether an acknowledgement signal is received from the communication hub 102 after, such as within a threshold period of time since, transmitting the signal toward the communication hub 102. In response to determining that the acknowledgement signal is received after transmitting the signal toward the communication hub 102, the electronic device 10 may determine that the communication hub 102 successfully received the transmitted signal. Therefore, the electronic device 10 may not re-transmit the signal. However, in response to determining that the acknowledgement signal is not received after transmitting the signal, the electronic device 10 may re-transmit the signal toward the communication hub 102. As such, the electronic device 10 may transmit the same signal toward the communication hub 102 to attempt to enable successful receipt of the signal by the communication hub 102.

In certain embodiments, the electronic device 10 may re-transmit the signal at a higher transmission power than a previous transmission power used to transmit the signal. As an example, the processor 12 may cause the transceiver 30 to re-transmit the signal at an updated transmission power that is a predetermined or preset amount greater than the most recent transmission power used to transmit the signal. As another example, the electronic device 10 may determine an updated elevation angle 108 and a corresponding transmission power based on the updated elevation angle 108, such as by using the reference information that associates respective transmission power values and elevation angle values with one another. In response to determining that the newly determined transmission power is greater than the most recent transmission power used to transmit the signal, the processor 12 may cause the transceiver 30 to re-transmit the signal at the newly determined transmission power. In a further example, the processor 12 may determine a first transmission power that is the predetermined amount greater than the most recent transmission power and determine a second transmission power that is based on the updated elevation angle 108. The processor 12 may determine the greater of the first transmission power and the second transmission power and cause the transceiver 30 to re-transmit the signal at the greater transmission power. The increased transmission power used to re-transmit the signal may improve a likelihood of receipt of the signal or receive signal quality of the signal at the communication hub 102.

The electronic device 10 may continually or repeatedly re-transmit the signal and iteratively increase the transmission power for each re-transmission until an acknowledgement signal is received from the communication hub 102. In other words, the transmission power may be increased each time the electronic device 10 re-transmits the signal. However, in some embodiments, the electronic device 10 may not transmit the signal at a transmission power greater than a threshold transmission power, such as the predetermined or maximum allowable transmission power. For example, in response to a determination that the signal is to be re-transmitted at an increased transmission power greater than the threshold transmission power, the processor 12 may instead cause the transceiver 30 to re-transmit the signal at the threshold transmission power. This may be because the threshold transmission power is a maximum possible transmission power at which the transmitter 52 is capable of transmitting, a maximum possible transmission power permitted by a regulatory entity (e.g., the Federal Communications Commission (FCC)), a maximum possible transmission power as configured by the communication hub 102, a communication network, or a communication operator, and so on. The processor 12 may also cause each subsequent re-transmission of the signal to be transmitted at the threshold transmission power instead of at a transmission power that exceeds the threshold transmission power. Therefore, the processor 12 may block transmission or re-transmission of a signal at above the threshold transmission power.

Furthermore, the electronic device 10 may independently transmit different signals directed to the communication hub 102 or to different communication hubs 102 at different transmission powers in order to transmit multiple signals at corresponding suitable or appropriate transmission powers. For example, the processor 12 may cause the transceiver 30 to transmit a first signal directed to the communication hub 102 at a first transmission power. Subsequently, the processor 12 may cause the transceiver 30 to transmit a second signal, different from the first signal, directed to the communication hub 102 at a second transmission power, which may be different from the first transmission power. Indeed, the electronic device 10 may transmit the second signal at the second transmission power regardless of the first transmission power used to transmit the first signal.

Similarly, the electronic device 10 may independently adjust the respective transmission powers for different signals. By way of example, the electronic device 10 may adjust (e.g., increase) the first transmission power used to re-transmit the first signal based on the most recent transmission power used to transmit the first signal toward the communication hub 102. Concurrently, the electronic device 10 may adjust (e.g., increase) the second transmission power used to re-transmit the second signal based on the most recent transmission power used to transmit the second signal toward the communication hub 102. However, the electronic device 10 may not adjust the first transmission power used to re-transmit the first signal based on the most recent transmission power used to transmit the second signal or any other signal different from the first signal toward the communication hub 102. Moreover, the electronic device 10 may not adjust the second transmission power used to re-transmit the second signal based on the most recent transmission power used to transmit the first signal or any other signal different from the second signal toward the communication hub 102. Further still, in response to determining that a certain signal (e.g., the first signal) is received by the communication hub 102, the electronic device 10 may continue to re-transmit other signals (e.g., the second signal) at adjusted transmission powers until the electronic device 10 determines that the other signals are received by the communication hub 102. Thus, respective transmissions of different signals may not affect one another to facilitate receipt of the signals by the communication hub 102.

Figure 4:
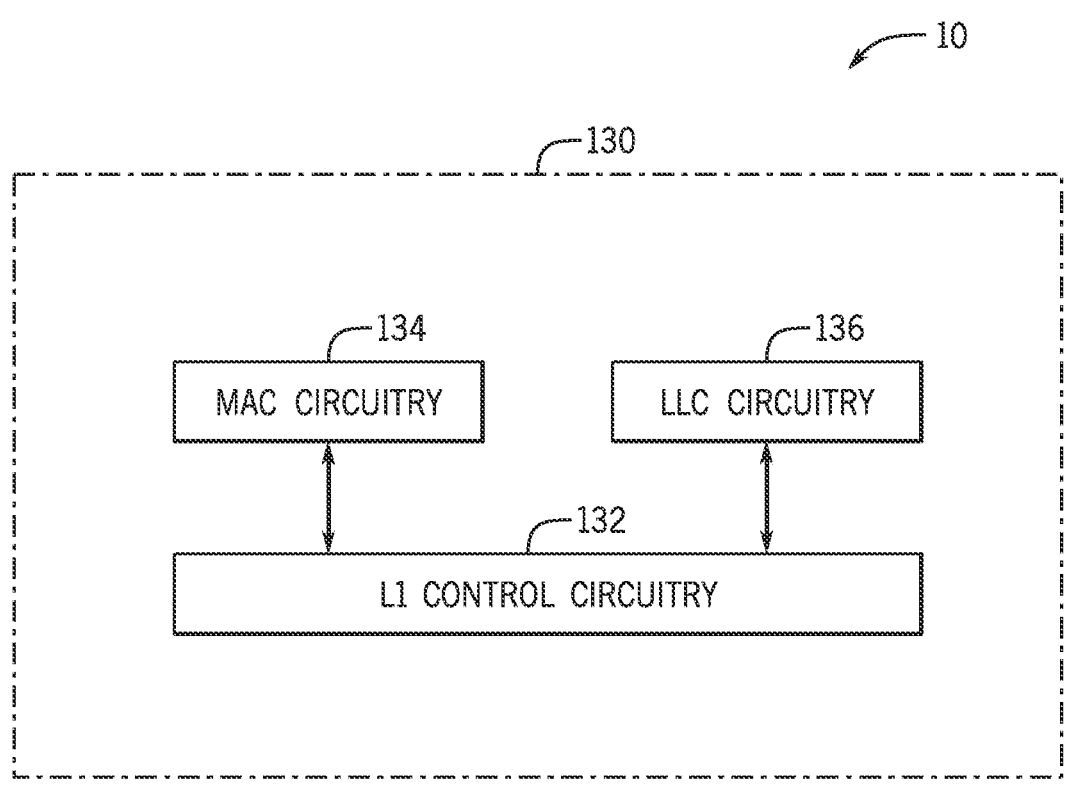
FIG. 4 is a schematic diagram of circuitry of the electronic device of FIG. 1, according to embodiments of the present disclosure.

FIG. 4 is a schematic diagram of circuitry 130 of the electronic device 10. As an example, the circuitry 130 may include data processing circuitry of the processor 12. The circuitry 130 may include Layer 1 (L1) control circuitry 132 (e.g., a physical layer controller), media access control (MAC) circuitry 134, and logic link control (LLC) circuitry 136. Each of the MAC circuitry 134 and the LLC circuitry 136 may be communicatively coupled to the L1 control circuitry 132. For example, the L1 control circuitry 132 may operate based on information received from the MAC circuitry 134 and/or the LLC circuitry 136.

In some embodiments, the L1 control circuitry 132 may cause the transceiver 30 to transmit a signal at a particular transmission power based on the information received from the MAC circuitry 134 and/or the LLC circuitry 136. For example, the MAC circuitry 134 may process data and communicate with the L1 control circuitry 132 to indicate that the data is to be transmitted by the electronic device 10 (e.g., as a signal). Moreover, the MAC circuitry 134 may provide information (e.g., a data frame) indicating a quantity of times the data or a signal having the data has been previously transmitted or re-transmitted. For example, the information may include a datagram number or value that indicates the quantity of times the data has been previously transmitted. Each time the data is to be re-transmitted, the datagram number may be increased (e.g., by a value of one) to indicate the quantity of previous transmissions. Furthermore, the LLC circuitry 136 may provide information indicating the elevation angle 108 of the communication hub 102 relative to the electronic device 10. In some embodiments, the LLC circuitry 136 may provide such information to the L1 control circuitry 132 at a predetermined frequency or cycle. Thus, the L1 control circuitry 132 may continually receive information regarding the elevation angle 108 from the LLC circuitry 136 and may readily utilize updated information regarding the elevation angle 108 when the L1 control circuitry 132 is to cause the transceiver 30 to transmit the data (e.g., in a radio frequency signal).

The L1 control circuitry 132 may determine a transmission power based on the information provided by the MAC circuitry 134 and/or the LLC circuitry 136. As an example, the L1 control circuitry 132 may determine whether to adjust (e.g., increase) the transmission power for transmitting or re-transmitting a signal having the data and/or an amount in which the transmission power is to be adjusted based on the information regarding the quantity of times in which the data or a signal having the data has been previously transmitted or re-transmitted, as received from the MAC circuitry 134. As another example, the L1 control circuitry 132 may establish the transmission power for transmitting and/or re-transmitting a signal having the data based on the information regarding the elevation angle 108, as received from the LLC circuitry 136. In this way, the L1 control circuitry 132 may cooperatively utilize information received from the MAC circuitry 134 and the LLC circuitry 136 to cause the transceiver 30 to transmit a signal at a particular transmission power.

Each of FIGS. 5 and 6 described below illustrates a respective method for communicating signals. Any suitable device, such as the processor 12, that may control components of the electronic device 10 may perform the methods. In some embodiments, each of the methods may be implemented by executing instructions stored in a tangible, non-transitory, computer-readable medium, such as the memory 14 or storage 16, using the processor 12. For example, the methods may be performed at least in part by one or more software components, such as an operating system of the electronic device 10, one or more software applications of the electronic device 10, and the like. While each of the methods is described using steps in a specific sequence, additional steps may be performed, the described steps may be performed in different sequences than the sequence illustrated, and certain described steps may be skipped or not performed altogether. Further still, the steps of any of the respective methods may be performed in parallel with one another, such as at the same time, and/or in response to one another. Moreover, while the methods of FIGS. 5 and 6 are described with respect to communication between the electronic device 10 and the communication hub 102, the techniques described herein may be implemented for communication between the electronic device 10 and any other recipient, such as the entity 104.

Figure 5:
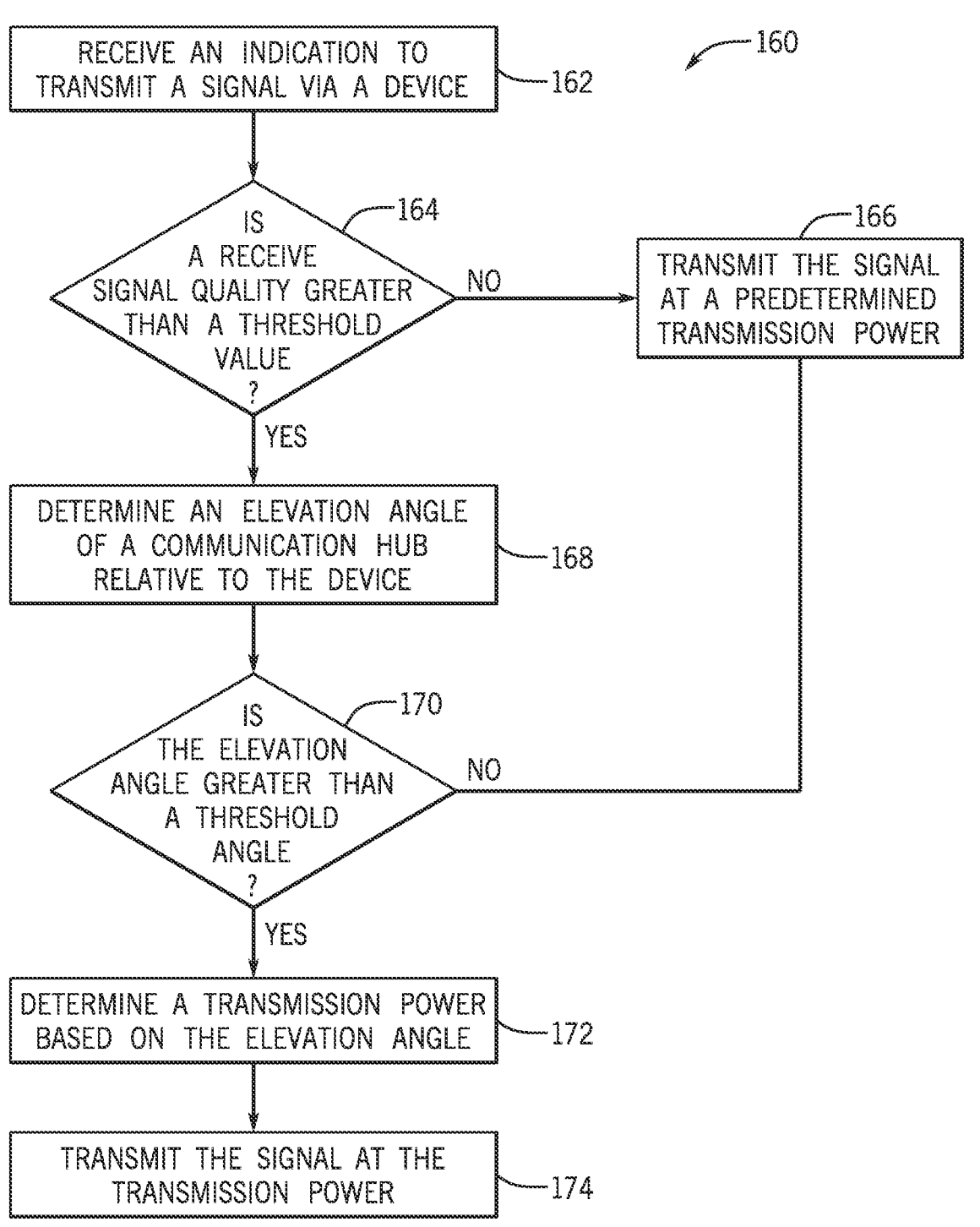
FIG. 5 is a flowchart of a method for adjusting transmission power used to transmit a signal via the electronic device of FIG. 1, according to embodiments of the present disclosure.
Figure 6:
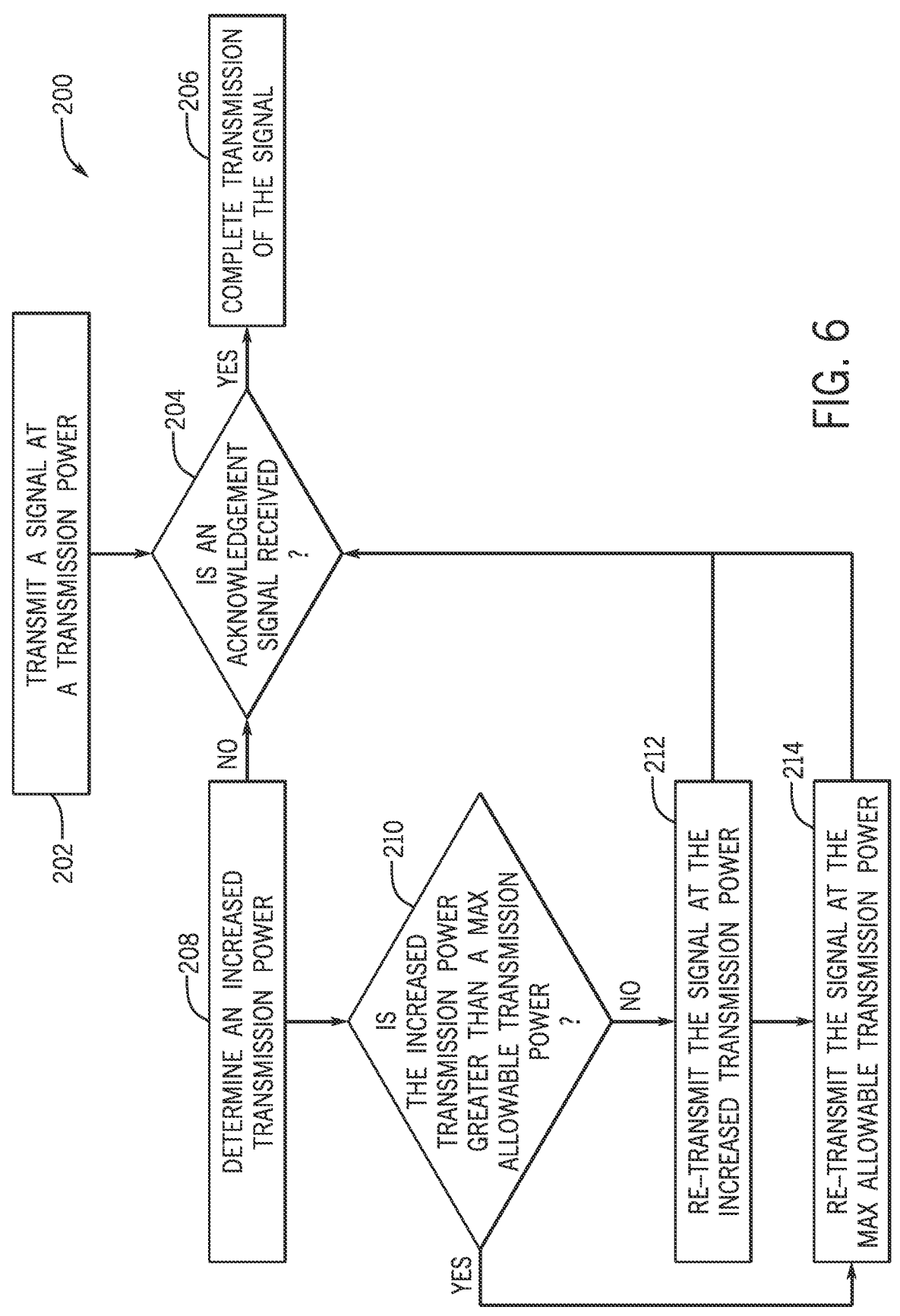
FIG. 6 is a flowchart of a method for adjusting transmission power used to re-transmit a signal via the electronic device of FIG. 1, according to embodiments of the present disclosure.

FIG. 5 is a flowchart of a method 160 for adjusting the transmission power used to transmit a signal by the electronic device 10, such as directed to the communication hub 102 for subsequent transmission to the entity 104. At block 162, the processor 12 may receive an indication to transmit a signal. As an example, the indication may be received via a user input, which may indicate a request to transmit the signal (e.g., for receipt by the entity 104). As another example, the indication be automatically received (e.g., without a user input), such as from an application, process, or client executed by the processor 12 on the electronic device 10. For instance, the indication may include determined parameters that may be received, such as via the sensor 106 and/or at the processor 12. Such parameters may include a time of day, an initially received signal (e.g., from the entity 104), an environmental condition (e.g., weather), or any other suitable parameter that may indicate a signal is to be transmitted in the signal.

At block 164, in response to receiving the indication to transmit the signal, the processor 12 may determine whether a receive signal quality of a received signal (e.g., a signal transmitted by the electronic device 10 and received by the communication hub 102, such as an initial or test signal) is greater than a threshold value (e.g., −100 decibel-milliwatts (dBm), −110 dBm, −120 dBm, −130 dBm, −140 dBm, −150 dBm) to indicate sufficient communication quality between the electronic device 10 and the communication hub 102. At block 166, in response to determining that the receive signal quality is not greater than the threshold value, thereby indicating a potentially poor communication quality between the electronic device 10 and the communication hub 102, the processor 12 may cause the transceiver 30 to transmit the signal directed to the communication hub 102 at a predetermined transmission power. In some embodiments, the predetermined transmission power may include a maximum possible transmission power at which the transmitter 52 is capable of transmitting, a maximum possible transmission power permitted by a regulatory entity (e.g., the FCC), a maximum possible transmission power as configured by the communication hub 102, a communication network, or a communication operator, and so on. For instance, the predetermined transmission power may be 23 dBm or greater, 24 dBm or greater, 24.5 dBm or greater, 25 dBm or greater, and so on.

However, at block 168, in response to determining that the receive signal quality is greater than the threshold value, thereby indicating a potentially sufficient communication quality between the electronic device 10 and the communication hub 102, the processor 12 may determine the elevation angle 108 of the communication hub 102 relative to the electronic device 10. For example, the processor 12 may determine the elevation angle 108 based on various parameters (e.g., determined via the sensor 106) associated with movement of the communication hub 102 and/or of the electronic device 10.

At block 170, the processor 12 may determine whether the elevation angle 108 is greater than a threshold angle, such as 20 degrees, 25 degrees, 30 degrees, or 35 degrees. In response to a determination that the elevation angle 108 is not greater than the threshold angle, thereby indicating a potentially poor communication quality between the electronic device 10 and the communication hub 102, the processor 12 may cause the transceiver 30 to transmit the signal directed to the communication hub 102 at the predetermined transmission power, as indicated at block 166. In some embodiments, the processor 12 may cause the transceiver 30 to transmit the signal at the same predetermined transmission power (e.g., a common transmission power value) in response to determining that the receive signal quality is not greater than the threshold value and in response to determining that the elevation angle 108 is not greater than the threshold angle. In additional or alternative embodiments, the processor 12 may cause the transceiver 30 to transmit the signal at different predetermined transmission powers in response to determining that the receive signal quality is not greater than the threshold value and in response to determining that the elevation angle 108 is not greater than the threshold angle. In either case, the predetermined transmission power may be a sufficient power level (e.g., a maximum transmission power level as described above) that facilitates receipt of the signal by the communication hub 102 while the communication quality may be poor, as indicated by the receive signal quality and/or the elevation angle 108.

At block 172, in response to determining the elevation angle 108 is greater than the threshold angle, the processor 12 may determine the transmission power based on the elevation angle 108. For instance, the processor 12 may use reference information (e.g., information stored in the memory 14 and/or storage 16, information accessible from a cloud-based server) that associates various transmission power values with respective, corresponding values of the elevation angle 108. Therefore, based on a determined elevation angle 108, the processor 12 may select the transmission power corresponding to the determined elevation angle 108 as indicated by the reference information. The reference information may establish an inversely proportional relationship between the transmission power and the elevation angle 108. By way of example, Table 1 below provides an example relationship between the transmission power and the elevation angle 108.

TABLE 1

| Tx Power (dBm) | Elevation Angle (degrees) |
|---|---|
| 24.5 | 30 and below |
| 23.5 | 30-35 |
| 22.5 | 35-40 |
| 21.5 | 40-45 |
| 20.5 | 45-50 |
| 19.5 | 50-55 |
| 18.5 | 55-60 |
| 17.5 | 60-65 |
| 16.5 | 65-70 |
| 15.5 | 70-75 |
| 14.5 | 75-80 |
| 13.5 | 80-85 |
| 12.5 | 85-90 |

In Table 1, the transmission power reduces by 1 decibel milliwatt (dBm), such as below a predetermined threshold of 24.5 dBm, for every 5 degrees that the elevation angle 108 is greater than a threshold angle, such as 30 degrees. However, in additional or alternative embodiments, the transmission power may have any other suitable relationship with respect to the elevation angle 108. By way of example, the transmission power may reduce by 2 dBm for every 5 degrees that the elevation angle 108 is greater than the threshold angle (e.g., 30 degrees or another threshold angle), the transmission power may reduce by 1 dBm for every 10 degrees that the elevation angle 108 is greater than the threshold angle, the transmission power may reduce by 0.5 dBm for every 2 degrees that the elevation angle 108 is greater than the threshold angle, and so on. Thus, the transmission power selected by the processor 12 based on the reference information may be less than the predetermined transmission power for a particularly determined elevation angle. At block 174, upon determining the transmission power, the processor 12 may cause the transceiver 30 to transmit the signal directed to the communication hub 102 at the transmission power.

FIG. 6 is a flowchart of a method 200 for adjusting the transmission power used to re-transmit a signal by the electronic device 10. At block 202, the processor 12 may cause the transceiver 30 to transmit a signal directed to the communication hub 102 at a transmission power, such as based on the elevation angle 108 in the manner determined via the method 160. At block 204, the processor 12 determines whether an acknowledgement signal is received from the communication hub 102, such as by the transceiver 30 (e.g., the receiver 54), to indicate successful receipt of the signal by the communication hub 102. For example, the processor 12 may determine whether the acknowledgement signal is received within a threshold period of time since the signal is transmitted toward the communication hub 102. To this end, the processor 12 may initiate a timer after causing the transceiver 30 to transmit the signal directed to the communication hub 102 at block 202. The processor 12 may refer to the timer to determine whether the threshold period of time has elapsed. At block 206, in response to determining that the acknowledgement signal is received within the threshold period of time, the processor 12 may determine that the signal was successfully received at the communication hub 102 and that transmission of signal has therefore been completed. For this reason, the processor 12 may not cause the transceiver 30 to re-transmit the signal toward the communication hub 102.

However, in response to determining that an acknowledgment signal is not received from the communication hub 102 within the threshold period of time, the processor 12 may determine that the signal is to be re-transmitted toward the communication hub 102. At block 208, the processor 12 may determine an increased transmission power for re-transmitting the signal. For example, the processor 12 may increase the transmission power at which the signal was most recently transmitted by a predetermined amount (e.g., 0.5 dBm or more, 1 dBm or more, 1.5 dBm or more, and so on) to determine the increased transmission power. Additionally or alternatively, the processor 12 may determine an updated elevation angle 108 of the communication hub 102 relative to the electronic device 10 and determine an updated transmission power corresponding to the updated elevation angle 108 (e.g., using Table 1 referenced above). In response to determining that the updated transmission power is greater than the transmission power at which the signal was most recently transmitted, the processor 12 may select the updated transmission power as the increased transmission power. In further embodiments, the processor 12 may determine a first increased transmission power by increasing the transmission power at which the signal was most recently transmitted by the predetermined amount, and the processor 12 may determine a second increased transmission power by determining the updated elevation angle 108 and the updated transmission power corresponding to the updated elevation angle 108. The processor 12 may then compare the first increased transmission power and the second increased transmission power to one another and select the greater of the first increased transmission power and the second increased transmission power as the final increased transmission power.

At block 210, the processor 12 may determine whether the increased transmission power is greater than a maximum allowable transmission power. In some embodiments, the maximum allowable transmission power may be the same as the predetermined transmission power used to transmit signal at block 166 of the method 160. At block 212, in response to determining that the increased transmission power is not greater than the maximum allowable transmission power, the processor 12 may cause the transceiver 30 to re-transmit the signal directed to the communication hub 102 at the increased transmission power. At block 214, in response to determining that the increased transmission power is greater than the maximum allowable transmission power, the processor 12 may cause the transceiver 30 to re-transmit the signal directed to the communication hub 102 at the maximum allowable transmission power. As such, the processor 12 may block or prevent transmission or re-transmission of the signal at greater than the maximum allowable transmission power.

After causing the transceiver 30 to re-transmit the signal directed to the communication hub 102, the processor 12 may then determine whether an acknowledgement signal is received within the threshold period of time since re-transmitting the signal. If a determination is made that no acknowledgement signal is received within the threshold period of time, the processor 12 may perform blocks 208, 210 again to determine the transmission power at which the signal is to be re-transmitted. Indeed, the processor 12 may cause the transceiver 30 to repeatedly re-transmit the signal at an increased transmission power until the acknowledgement signal is received. The processor 12 may also iteratively increase the transmission power each time the signal is re-transmitted until the acknowledgement signal is received, at which point the signal may no longer be re-transmitted, or the maximum allowable transmission power is reached, at which point the processor 12 may cause the transceiver 30 to transmit the signal at the maximum allowable transmission power. In this manner, the processor 12 may cause the transceiver 30 to increase potential receipt of the signal by the communication hub 102 without transmitting the signal at above the maximum allowable transmission power.

Embodiments of the present disclosure are directed to operating an electronic device (e.g., a mobile communicating device) to communicate signals, such as to transmit a signal toward a communication hub for transmission to a target recipient. In response to a receive signal quality being greater than a threshold value, the electronic device may determine an elevation angle of the communication hub relative to the electronic device and transmit the signal at a transmission power based on the elevation angle. Adjusting the transmission power based on the elevation angle may limit power consumption associated with transmitting signal, such as in comparison with transmitting the signal at a common (e.g., excessively high) transmission power regardless of the elevation angle, while facilitating receipt of the signal by the communication hub. In response to the receive signal quality being below the threshold value, the electronic device may transmit the signal at a predetermined transmission power to facilitate receipt of the signal by the communication hub. The electronic device may also determine whether the communication hub successfully receives the transmitted signal based on whether an acknowledgement signal is received. In response to determining that the acknowledgement signal is not received, thereby indicating that the communication hub did not successfully receive the transmitted signal, the electronic device may re-transmit the signal. For example, the electronic device may increase the transmission power at which the signal is re-transmitted, thereby improving signal receiving capability by the communication hub, without exceeding a maximum allowable transmission power. As such, the electronic device may more suitably or efficiently utilize power to transmit signal for receipt by the communication hub.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device, comprising:
a transmitter; and
processing circuitry communicatively coupled to the transmitter and configured to
   receive a first indication of a position of a communication hub relative to the electronic device,
   cause the transmitter to transmit a signal directed to the communication hub at a transmission power based on the position;
   receive a second indication of an updated position of the communication hub relative to the electronic device based on not receiving an acknowledgement signal associated with the signal from the communication hub within a threshold period of time; and
   cause the transmitter to re-transmit the signal directed to communication hub at an increased transmission power based on the updated position.

2. The electronic device of claim 1, wherein the position comprises an elevation angle of the communication hub relative to the electronic device.

3. The electronic device of claim 2, wherein the processing circuitry is configured to
   cause the transmitter to transmit the signal directed to the communication hub at a first transmission power based on a first elevation angle of the communication hub relative to the electronic device.

4. The electronic device of claim 1, comprising a receiver, wherein the processing circuitry is configured to
   determine that an acknowledgement signal to be transmitted by the communication hub is not received by the receiver within a threshold period of time after causing the transmitter to transmit the signal directed to the communication hub, and
   cause the transmitter to re-transmit the signal directed to the communication hub at the increased transmission power based on the updated position and the receiver not receiving the acknowledgement signal within the threshold period of time after causing the transmitter to transmit the signal directed to the communication hub.

5. The electronic device of claim 4, wherein the processing circuitry is configured to determine the increased transmission power by increasing the transmission power by a predetermined amount based on the receiver not receiving the acknowledgement signal.

6. The electronic device of claim 4, wherein the processing circuitry is configured to determine the updated position of the communication hub relative to the electronic device based on the receiver not receiving the acknowledgement signal, and determine the increased transmission power based on the updated position.

7. The electronic device of claim 1, comprising a sensor configured to determine a parameter associated with movement of the communication hub, movement of the electronic device, or both, wherein the processing circuitry is configured to determine the position based on the parameter.

8. The electronic device of claim 3, wherein the processing circuitry is configured to cause the transmitter to transmit the signal directed to the communication hub at a second transmission power based on a second elevation angle of the communication hub relative to the electronic device, the second transmission power being less than the first transmission power, and the second elevation angle being greater than the first elevation angle.

9. A non-transitory, computer-readable medium comprising instructions that, when executed by processing circuitry, cause the processing circuitry to:

receive a first indication of an elevation angle of a communication hub relative to an electronic device;

receive a second indication to transmit a first signal directed to the communication hub based on the elevation angle;

receive a second signal from the communication hub;

cause the electronic device to transmit the first signal at a predetermined transmission power if a signal quality of the second signal is below a threshold value; and cause the electronic device to transmit the first signal at a transmission power based on the elevation angle if the signal quality exceeds the threshold value.

10. The non-transitory, computer-readable medium of claim 9, wherein the instructions, when executed by the processing circuitry, cause the processing circuitry to determine the transmission power based on the elevation angle.

11. The non-transitory, computer-readable medium of claim 9, wherein the instructions, when executed by the processing circuitry, cause the processing circuitry to:

determine that an acknowledgement signal is not received by the electronic device within a threshold period of time since causing the electronic device to transmit the first signal directed to the communication hub;

determine an increased transmission power based on the electronic device not receiving the acknowledgement signal; and cause the electronic device to re-transmit the first signal directed to the communication hub at the increased transmission power.

12. The non-transitory, computer-readable medium of claim 11, wherein the instructions, when executed by the processing circuitry, cause the processing circuitry to:

determine a first transmission power by increasing the transmission power by a predetermined amount;

determine a second transmission power based on an updated elevation angle of the communication hub relative to the electronic device; and determine the increased transmission power based on a greater of the first transmission power and the second transmission power.

13. The non-transitory, computer-readable medium of claim 12, wherein the instructions, when executed by the processing circuitry, cause the processing circuitry to:

receive a plurality of transmission power values corresponding to a plurality of elevation angles; and determine the transmission power based on a transmission power value of the plurality of transmission power values corresponding to the updated elevation angle.

14. The non-transitory, computer-readable medium of claim 11, wherein the instructions, when executed by the processing circuitry, cause the processing circuitry to:

determine the increased transmission power is greater than a maximum allowable transmission power; and cause the electronic device to re-transmit the first signal directed to the communication hub at the maximum allowable transmission power based on the increased transmission power being greater than the maximum allowable transmission power.

15. A method comprising:

receiving, via processing circuitry of an electronic device, an indication of an elevation angle of a communication hub relative to the electronic device, and causing a transmitter of the electronic device to transmit a signal directed to the communication hub at a predetermined transmission power based on the elevation angle being below a threshold angle.

16. The method of claim 15, comprising determining, via the processing circuitry, the elevation angle of the communication hub relative to the electronic device.

17. The method of claim 15, comprising:

determining, via the processing circuitry, whether an acknowledgement signal is received within a threshold period of time after causing the transmitter to transmit the signal directed to the communication hub;

repeatedly causing, via the processing circuitry, the transmitter to re-transmit the signal directed to the communication hub until the acknowledgement signal is received; and iteratively increasing, via the processing circuitry, the predetermined transmission power at which the transmitter re-transmits the signal.

18. The method of claim 17, comprising iteratively increasing, via the processing circuitry, the predetermined transmission power at which the transmitter re-transmits the signal until the predetermined transmission power, as iteratively increased, reaches a maximum allowable transmission power.

19. The method of claim 15, comprising causing the transmitter to transmit the signal at a transmission power based on the elevation angle if the elevation angle exceeds the threshold angle.

20. The method of claim 19, comprising adjusting, via the processing circuitry, the transmission power based on an inversely proportional relationship between the transmission power and the elevation angle.

* * * * *